(12) United States Patent
Reid et al.

(10) Patent No.: US 11,286,185 B1
(45) Date of Patent: Mar. 29, 2022

(54) SYSTEM AND METHOD OF SCUM COLLECTION IN WASTEWATER TREATMENT SYSTEMS

(71) Applicants: Terence K. Reid, Poplar Grove, IL (US); David Smith, Beloit, WI (US)

(72) Inventors: Terence K. Reid, Poplar Grove, IL (US); David Smith, Beloit, WI (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

(21) Appl. No.: 17/096,005

(22) Filed: Nov. 12, 2020

(51) Int. Cl.
*C02F 3/12* (2006.01)
*B01D 21/24* (2006.01)
*B01D 21/00* (2006.01)
*C02F 1/00* (2006.01)

(52) U.S. Cl.
CPC ........ *C02F 3/1263* (2013.01); *B01D 21/0042* (2013.01); *B01D 21/2433* (2013.01); *B01D 21/2444* (2013.01); *C02F 2001/007* (2013.01)

(58) Field of Classification Search
CPC .... C02F 3/1263; C02F 3/301; B01D 21/0042; B01D 21/2433; B01D 21/2444
USPC .......................... 210/605, 620, 630, 800, 540
See application file for complete search history.

(56) References Cited

U.S. PATENT DOCUMENTS

| | | | | |
|---|---|---|---|---|
| 4,596,658 A | * | 6/1986 | Mandt | C02F 3/1263 210/620 |
| 4,695,376 A | * | 9/1987 | Astrom | B01D 21/2433 210/242.1 |
| 4,883,602 A | * | 11/1989 | Anderson | B01D 21/2444 210/803 |
| 4,891,128 A | * | 1/1990 | Goronszy | B01D 21/2444 210/525 |
| 5,104,528 A | * | 4/1992 | Christie | B01D 21/2433 210/540 |
| 5,421,995 A | * | 6/1995 | Norcross | C02F 3/1263 210/242.1 |
| 7,328,809 B2 | * | 2/2008 | Gigas | B01D 11/0453 210/540 |
| 2013/0015127 A1 | * | 1/2013 | Topol | C02F 3/1263 210/620 |

* cited by examiner

*Primary Examiner* — Christopher Upton
(74) *Attorney, Agent, or Firm* — Vitale, Vickrey, Niro & Gasey LLP

(57) ABSTRACT

System and method of scum collection and removal in batch biological wastewater treatment systems.

8 Claims, 2 Drawing Sheets

US 11,286,185 B1

SYSTEM AND METHOD OF SCUM COLLECTION IN WASTEWATER TREATMENT SYSTEMS

BACKGROUND OF THE INVENTION

The present inventions relate to systems and methods of scum collection in water and wastewater treatment applications. More particularly, the present inventions relate to systems and methods of scum collection including decant troughs and dedicated scum chambers.

SUMMARY OF THE INVENTION

Biological water and wastewater treatment processes, such as sequencing batch reactors, use decant mechanisms to withdraw treated and clarified effluent for discharge. Scum is a floating material by-product of typical biological wastewater treatment processes. Scum which is allowed to exit a reactor via a free surface can cause treatment and operational issues for downstream processes such as filtration and disinfection systems. Baffles and submerged intakes alleviate this concern, but results in scum build-up within the reactor which can impact reactor performance and create nuisance issues such as odor, insects and unsightly reactor surface conditions. Scum build-up can be managed in several ways.

For example, baffles and submerged intakes as part of a treatment process can be used to manage scum. Surface scum skimming devices are also available and often used to selectively remove the scum. However, these devices are limited in their size and ability to migrate the scum to the skimming device and usually include a significant amount of water to effectively remove scum. Such devices remove a portion of the scum but aren't effective in removing it fully from the reactor. Such systems are, among other things, inefficient.

Thus, there is a need for an efficient scum collection and removal system. There is also a need to remove scum essentially fully from a reactor's surface within a short time period of, for example, approximately 5 to 20 minutes while not removing significant amounts of water with the scum.

Therefore, an object of the present invention is to provide for a scum collector for use in a batch wastewater treatment reactor.

Another object of the present invention is to provide for a scum collector for use in a reactor tank or basin having a decant weir assembly and an effluent trough assembly.

A further object of the present invention is to include a decant weir assembly having a trough that is isolated from but in fluid communication with the reactor contents.

Still another object of the present invention is to provide that the decanted and scum flows over a decant weir of a decant weir assembly and into a decant trough.

Still a further object of the present invention is to provide a decant weir assembly in fluid communication with the scum collector assembly.

In a preferred embodiment of the present inventions, a scum collection system or assembly for use in wastewater treatment is provided, the treatment system having at least one reactor tank where the decanting of wastewater occurs; at least one decant trough having a decant weir, the decant trough isolated from but in fluid communication with the reactor tank contents and the decant weir permitting the flow of decanted fluid and scum from the reactor tank into the decant trough; at least one effluent trough having a bottom surface, the effluent trough isolated from the reactor contents and in fluid communication with the decant trough such that the effluent trough receives the decanted fluid and scum; and, a scum collection system in fluid communication with the effluent trough, the scum collection system including a scum chamber, a scum baffle and a scum valve or pump inlet, the scum baffle having an upper and lower end, the upper end entrapping the sludge and the lower end permitting passage of the decanted fluid to an effluent discharge chamber. The scum valve may also be a pump inlet in other embodiments. In addition, the scum chamber has a lower surface, the lower surface being below the bottom surface of the effluent trough. And, the upper end of the scum baffle extends above an anticipated scum level and the lower end extends below the bottom surface of the effluent trough. In a preferred embodiment, scum collected in the scum chamber is periodically drained using a scum drain.

The present inventions also provide a method for collecting and removing scum from a reactor tank. The steps include introducing wastewater to be treated into the reactor tank; decanting the treated liquid using a decant weir assembly having a decant trough and a decant weir, the decant trough being isolated from but in fluid communication with the reactor tank, the decanted fluid and any scum flowing over the decant weir and into the decant trough; transferring the decanted fluid and scum from the decant trough to an effluent trough, the effluent trough isolated from the reactor tank but in fluid communication with the decant trough; and, transferring the decanted fluid and scum to a scum collection system, the scum collection system isolating the scum in a scum collection chamber using a scum baffle and permitting the effluent flow to flow to an effluent discharge chamber.

Inventor's Definition of the Terms

The terms used in the claims of this patent are intended to have their broadest meaning consistent with the requirements of law. Where alternative meanings are possible, the broadest meaning is intended consistent with the understanding of those of ordinary skill in the art. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

The principal components of a biological wastewater treatment system incorporating the scum collection and removal system of the present invention include a reactor tank 10, a decant trough 20, an effluent trough 30 and a scum collection system 40. An embodiment of the present inventions is described herein by reference to a rectangular reactor tank 10. However, it will be understood by those of skill in the art that circular, square or variously shaped reactor tanks or basins may be used in applying the systems and methods claimed in this patent.

Figure 1:
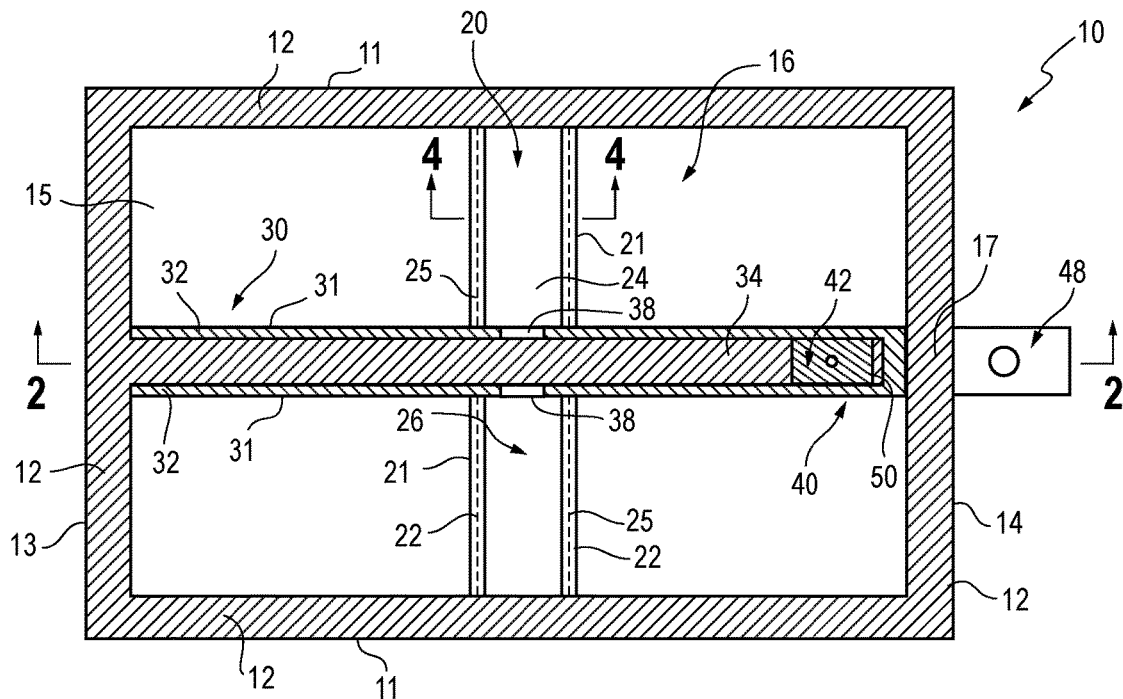
FIG. 1 is a top plan view of a biological wastewater treatment system incorporating a scum collection and removal system of the present invention.

By reference to FIG. 1, reactor tank 10 includes two side walls 11 having a top 12. Also provided is a rear wall 13 and a front wall 14, all of which also have a top 12. The top 12 of reactor tank 10 is typically open, although those of skill in the art will understand that all or a portion of the top 12 of reactor tank 10 may be enclosed. A bottom 15 is also provided. The interior 16 of reactor tank 10 holds the volume of wastewater to be treated. It will be understood that the reactor 10 and other components described herein may be made from concrete, steel or other materials or combinations thereof. Along the bottom 15 of tank 10 are treatment system components (not shown) that treat the wastewater introduced into the interior 16 of tank 10. It will also be understood by those of skill in the art that the present inventions may be applied to a variety of batch treatment systems, including but not limited to the AquaMSBR® system of Aqua-Aerobic Systems, Inc., the assignee of this patent.

Figure 4:
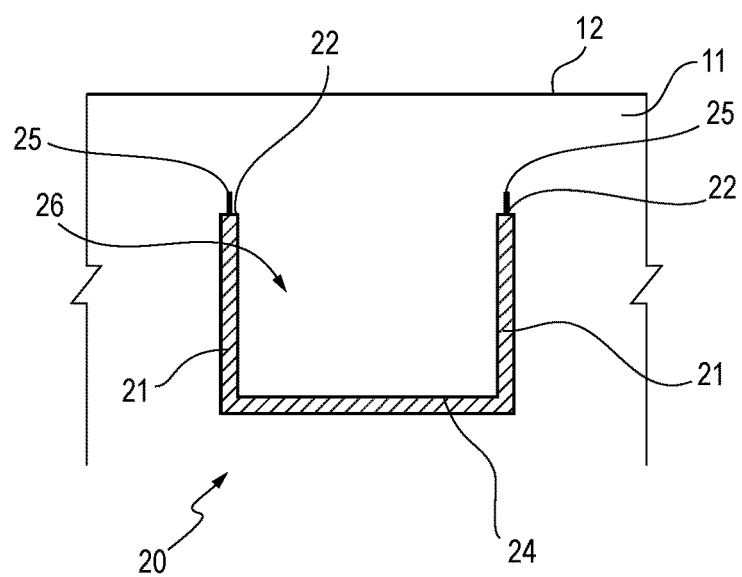
FIG. 4 is a side plan view of a representative decant trough taken along line 4-4 of FIG. 1.

The decant trough 20 component may best be seen by reference to FIGS. 1 and 4. Decant trough 20 extends between side walls 11 of reactor tank 10 and effluent trough 30 and is in fluid communication therewith as hereinafter described. Decant trough 20 is composed of two side walls 21, each having a top 22. A bottom 24 interconnects side walls 21. At the top 22 of each side wall 21 is a decant weir 25. It is preferable, but not required, that weir 25 be a v-notched weir 25 as will be understood by those of skill in the art. As will also be understood by those of skill in the art, the bottom 24 of decant trough 20 is generally level and the opening (end) drains fully into the effluent trough 30. Alternatively, decant trough may slope downwardly from the side walls 11 toward the effluent trough 30 to permit the decanted fluid to flow into the effluent trough 30. Effluent trough 30 is preferably sloped.

As shown in FIGS. 1 and 4, the side walls 21 and bottom 24 of decant trough 20 are attached to the interior of side wall 11 at one end and to a side wall 31 of effluent trough 30 at the other end as hereinafter described. As a result, the interior 26 of decant trough 20 is isolated from the reactor contents except during the decant process, when the liquid level is above decant weirs 25 as hereinafter described. It will also be understood by those of skill in the art, that separate end walls (not shown) may be provided at the ends of the side walls 21, which may then be attached to side wall 11 of reactor 10 and side wall 31 of effluent trough 30. Such an embodiment is particularly useful for retrofit applications.

Figure 2:
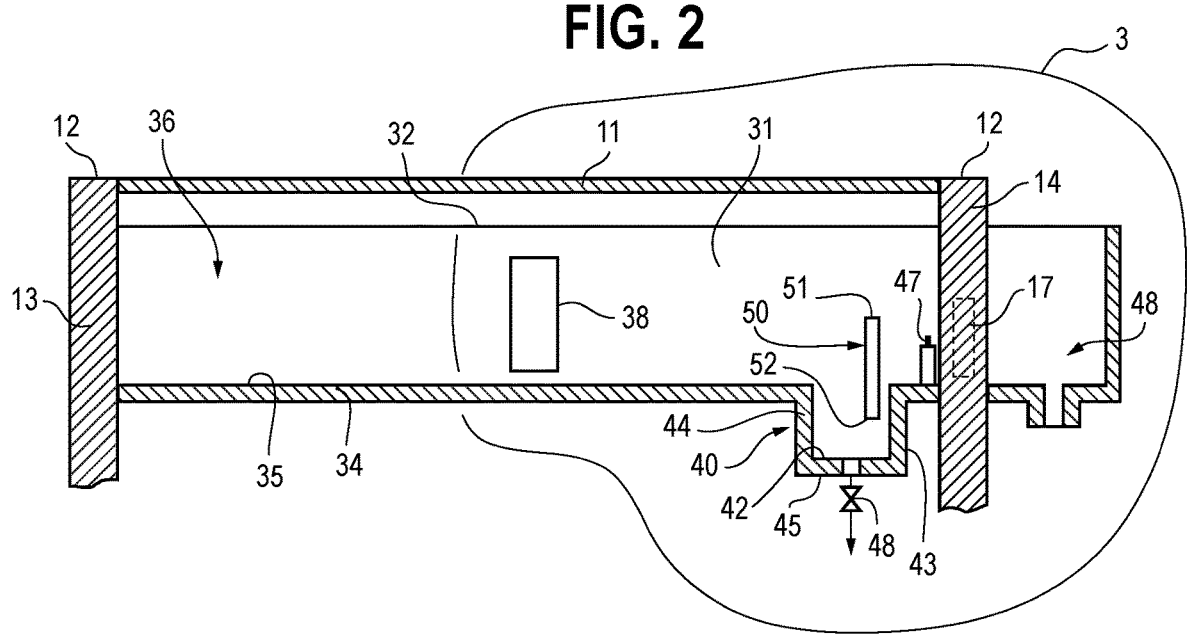
FIG. 2 is a side plan view of the system of FIG. 1, taken along line 2-2.
Figure 3:
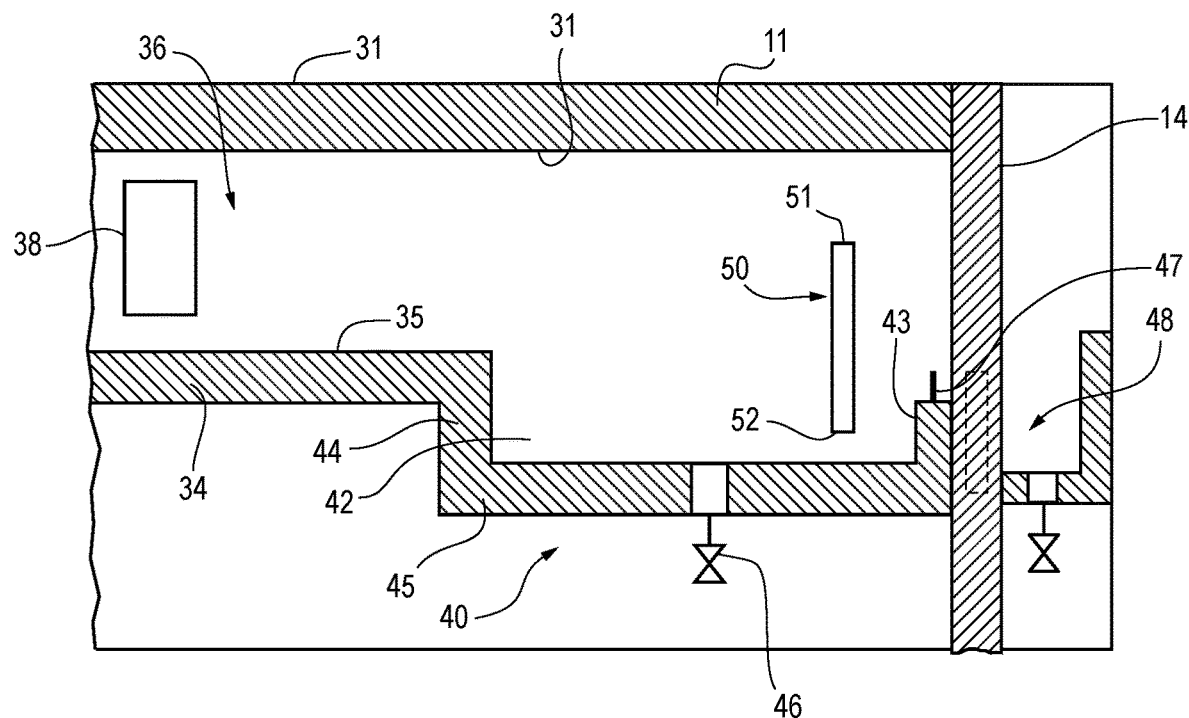
FIG. 3 is a side plan view of a scum collection system taken from bubble 3 of FIG. 2.

Effluent trough 30, and its associated scum collection system 40, may best be seen by reference to FIGS. 1, 2 and 3. In a preferred embodiment, effluent trough 30 extends between front wall 14 and back wall 13 of tank 10. A preferred effluent trough 30 includes two side walls 31, each having a top 32. A bottom 34, having an upper surface 35, interconnects side walls 31.

The interior 36 of effluent trough 30 is isolated from the reactor tank 10 contents. Similar to the decant trough 20, effluent trough 30 may include end walls (not shown) or may be attached to or made as part of end walls 13, 14 of tank 10. Effluent trough 30 is assembled so that the bottom 34 slopes from the rear wall 13 to the front wall 14. In a preferred embodiment, side walls 31 of the effluent trough 30 includes an opening or passageway 38 located where the decant trough 20 meets the effluent trough 30. In this manner, decant trough 20 is in fluid communication with effluent trough 30.

As shown in FIGS. 2 and 3, scum collection system 40 is located at the front end of effluent trough 30. In some cases, it may be necessary to move the scum collection system 40 to a location outside the reactor 10. For example, if the flow rate is too high due to numerous decant troughs tying into the effluent trough causing scum entrainment. In such a case, the scum collection system may be configured in a small chamber located outside the reactor 10 walls.

Scum collection system 40 includes a scum chamber 42. In a preferred embodiment, scum chamber 42 is formed from a front end wall 43, a back end wall 44 and a bottom 45. Front end wall 43, back end wall 44 and bottom 45 extend between the side walls 31 of effluent trough 30. Bottom 45 is provided with a scum drain 46. Scum chamber 42 is situated below the upper surface 35 of effluent trough 30. As shown, scum chamber 42 is a rectangular chamber extending along the width of effluent trough 30. It will be understood by those of skill in the art that scum chamber 42 does not have to be rectangular and scum collection system 40 may be located entirely outside the front wall 14.

An effluent weir 47 may be provided at the front end 43 of scum chamber 42. An opening 17 on front wall 14 of tank 10 leads to discharge chamber 48 having an effluent drain 49. The configuration of a typical discharge chamber 48 will be understood by those of skill in the art. In operation, decanted effluent flows over effluent weir 47 into discharge chamber 48 and out effluent drain 49 as hereinafter described.

A scum baffle 50 is also provided as part of the scum collection system 40. In a preferred embodiment, scum baffle 50 is a plate having a top edge 51 and a bottom edge 52. In a preferred embodiment, scum baffle 50 extends between side walls 31 of effluent trough 30. Scum baffle 50 may be attached to side walls 31 by bolts or other well-known means or may be formed as part of the side walls 31. Scum baffle 50 is positioned so that the top 51 is above the anticipated scum level and the bottom is located below the upper surface 35 of the bottom 34 of effluent trough 30 to function as hereinafter described.

In operation, wastewater is introduced into the reactor tank 10 for treatment, as will be understood by those of ordinary skill in the art. The treated liquid is decanted using decant trough 20 by flowing over decant weir 25 and into the decant trough 20. This flow typically includes treated liquid and scum. The decanted fluid and any scum is transferred to the effluent trough 30 by flowing along decant trough 20, through passageway 38 and into the effluent trough 30 and to scum collection system 40. Scum is blocked from traveling to the discharge chamber 48 by scum baffle 50.

Specifically, the floating scum is trapped by scum baffle 50. Decanted fluid, without scum, travels under the bottom 52 of scum baffle 50, over effluent weir 47, through opening 17 and into discharge chamber 48 for discharge from the treatment system and reactor tank 10. As scum builds up in scum chamber 42, it may be periodically removed using scum drain 46.

From time to time, the water flow from the reactor to the decant weir 47 will be stopped. This could be accomplished by dropping the reactor water level below the weir 25 or using a pressurized decant hood assembly (not shown). This allows the decant trough 20 to drain completely into the effluent trough, which drains out the effluent discharge pipe (and valve 49) and eventually leaves only the contents in the scum chamber 42.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A scum collection system for use in wastewater treatment, comprising:
    at least one reactor tank where the decanting of wastewater occurs;
    at least one decant trough having a decant weir, the decant trough isolated from but in fluid communication with the reactor tank contents and the decant weir permitting the flow of decanted fluid and scum from the reactor tank into the decant trough;
    at least one effluent trough having a bottom surface, the effluent trough isolated from the reactor contents and in fluid communication with the decant trough such that the effluent trough receives the decanted fluid and scum;
    a scum collection system in fluid communication with the effluent trough, the scum collection system including a scum chamber, a scum baffle and a scum valve or pump inlet, the scum baffle having an upper and lower end, the upper end entrapping the sludge and the lower end permitting passage of the decanted fluid to an effluent discharge chamber.

2. The scum collection system of claim 1 wherein the scum chamber has a lower surface, the lower surface being below the bottom surface of the effluent trough.

3. The scum collection system of claim 2 wherein the upper end of the scum baffle extends above an anticipated scum level and the lower end extends below the bottom surface of the effluent trough.

4. The scum collection system of claim 3 wherein scum collected in the scum chamber is periodically drained by the scum drain.

5. The scum collection system of claim 1 wherein the scum collection system is in fluid communication with the decant trough.

6. A scum collection system for use in wastewater treatment, comprising:
    at least one reactor tank where the decanting of wastewater occurs;
    at least one decant trough having a decant weir, the decant trough isolated from but in fluid communication with the reactor tank contents and the decant weir permitting the flow of decanted fluid and scum from the reactor tank into the decant trough;
    at least one effluent trough having a bottom surface, the effluent trough isolated from the reactor contents and in fluid communication with the decant trough such that the effluent trough receives the decanted fluid and scum;
    a scum collection system in fluid communication with the decant trough, the scum collection system including a scum chamber, a scum baffle and a scum valve or pump inlet, the scum baffle having an upper and lower end, the upper end entrapping the sludge and the lower end permitting passage of the decanted fluid for discharge to a discharge chamber.

7. The scum collection system of claim 6 wherein the scum chamber has a lower surface, the lower surface being below the bottom surface of the effluent trough.

8. A method for collecting and removing scum from a reactor tank comprising the steps of:
    introducing wastewater to be treated into the reactor tank;
    decanting the treated liquid using a decant weir assembly having a decant trough and a decant weir, the decant trough being isolated from but in fluid communication with the reactor tank, the decanted fluid and any scum flowing over the decant weir and into the decant trough;
    transferring the decanted fluid and scum from the decant trough to an effluent trough, the effluent trough isolated from the reactor tank but in fluid communication with the decant trough;
    transferring the decanted fluid and scum to a scum collection system, the scum collection system isolating the scum in a scum collection chamber using a scum baffle and permitting the effluent flow to flow to an effluent discharge chamber.

* * * * *